United States Patent
Zeng et al.

(10) Patent No.: US 10,285,180 B2
(45) Date of Patent: May 7, 2019

(54) RESERVED RESOURCE POOL ASSISTED ACCESS RESOURCE SELECTION FOR SMALL DATA TRANSMISSION

(71) Applicant: QUALCOMM Incorporated, San Diego, CA (US)

(72) Inventors: Wei Zeng, San Diego, CA (US); Joseph Binamira Soriaga, San Diego, CA (US); Tingfang Ji, San Diego, CA (US); John Edward Smee, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/926,809

(22) Filed: Oct. 29, 2015

(65) Prior Publication Data
US 2016/0270053 A1 Sep. 15, 2016

Related U.S. Application Data

(60) Provisional application No. 62/133,365, filed on Mar. 14, 2015.

(51) Int. Cl.
*H04W 72/04* (2009.01)
*H04W 28/26* (2009.01)
(Continued)

(52) U.S. Cl.
CPC ........... *H04W 72/048* (2013.01); *H04L 67/12* (2013.01); *H04W 28/26* (2013.01);
(Continued)

(58) Field of Classification Search
CPC ........... H04W 72/048; H04W 72/0446; H04W 72/085; H04W 72/1289; H04W 74/004;
(Continued)

(56) References Cited

U.S. PATENT DOCUMENTS

| 7,606,257 B2 | 10/2009 | Barratt et al. |
| 2010/0268951 A1* | 10/2010 | Ryu ................. H04W 36/0038 713/169 |

(Continued)

FOREIGN PATENT DOCUMENTS

| JP | 2014030117 A | 2/2014 |
| JP | 2016514416 A | 5/2016 |

(Continued)

OTHER PUBLICATIONS

International Search Report and Written Opinion—PCT/US2016/020045—ISA/EPO—dated Jul. 19, 2016.
(Continued)

*Primary Examiner* — Gregory B Sefcheck
*Assistant Examiner* — Majid Esmaeilian
(74) *Attorney, Agent, or Firm* — Qualcomm IP Dept.; James Hunt Yancey, Jr.

(57) ABSTRACT

Wireless communications systems and methods related to the reduction in a probability of collision for grant-less transmissions from internet of everything (IOE) devices while not increasing search complexity at a base station are disclosed. An IOE device randomly selects a first access resource from a common pool that the base station searches to initiate a transmission. If a metric associated with the data transmission is predicted to exceed a threshold, the IOE device also requests a second access resource from a reserved access pool from the base station, that the base station does not search. The IOE includes the request in the data transmission. The base station and the IOE device switch to the second access resource after the base station identifies an available resource from the reserved access pool and the IOE device completes the data transmission using the second access resource.

30 Claims, 7 Drawing Sheets

(51) Int. Cl.
- *H04L 29/08* (2006.01)
- *H04W 72/08* (2009.01)
- *H04W 52/02* (2009.01)
- *H04W 74/08* (2009.01)
- *H04W 72/12* (2009.01)
- *H04W 74/00* (2009.01)

(52) U.S. Cl.
CPC ... *H04W 52/0212* (2013.01); *H04W 72/0446* (2013.01); *H04W 72/085* (2013.01); *H04W 74/08* (2013.01); *H04W 72/1289* (2013.01); *H04W 74/004* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01)

(58) Field of Classification Search
CPC .. H04W 74/08; H04W 52/0212; H04L 67/12; Y02B 60/50
USPC ........................................................ 370/252
See application file for complete search history.

(56) References Cited

U.S. PATENT DOCUMENTS

| | | |
|---|---|---|
| 2011/0176500 A1 | 7/2011 | Wager et al. |
| 2011/0274040 A1* | 11/2011 | Pani ..................... H04W 4/005 370/328 |
| 2012/0044878 A1 | 2/2012 | Ratasuk et al. |
| 2012/0213196 A1 | 8/2012 | Chung et al. |
| 2013/0163354 A1* | 6/2013 | Song ..................... G11C 7/1006 365/194 |
| 2013/0163355 A1* | 6/2013 | Son ....................... G11C 29/787 365/200 |
| 2013/0163356 A1* | 6/2013 | Yanagida ................ G11C 29/40 365/200 |
| 2013/0163357 A1* | 6/2013 | Buer ....................... G11C 8/08 365/201 |
| 2013/0163537 A1* | 6/2013 | Anderson ......... H04W 72/1284 370/329 |
| 2013/0273951 A1 | 10/2013 | Wang et al. |
| 2013/0336234 A1* | 12/2013 | Ghosh ................... H04W 72/10 370/329 |
| 2014/0066080 A1* | 3/2014 | Pradas .............. H04W 72/0413 455/450 |
| 2014/0086220 A1* | 3/2014 | Shi ........................ H04L 5/0082 370/336 |
| 2014/0146754 A1 | 5/2014 | Bayesteh et al. |
| 2014/0254544 A1 | 9/2014 | Kar et al. |
| 2015/0023281 A1* | 1/2015 | Wu ..................... H04W 52/146 370/329 |
| 2015/0156806 A1 | 6/2015 | Pan |
| 2015/0173060 A1 | 6/2015 | Ge et al. |
| 2015/0208332 A1 | 7/2015 | Baghel et al. |
| 2015/0215903 A1 | 7/2015 | Zhao et al. |
| 2016/0249198 A1 | 8/2016 | Kim et al. |
| 2016/0255654 A1 | 9/2016 | Lin et al. |
| 2016/0270083 A1 | 9/2016 | Zeng et al. |
| 2017/0181089 A1 | 6/2017 | Baker et al. |

FOREIGN PATENT DOCUMENTS

| | | |
|---|---|---|
| WO | WO-2005071897 A1 | 8/2005 |
| WO | WO-2014056426 A1 | 4/2014 |
| WO | WO-2015065130 A1 | 5/2015 |

OTHER PUBLICATIONS

Fujitsu: "Resource Allocation for Discovery Signal," R1-140200, 3GPP TSG-RAN WG1 Meeting #76, Prague, Czech Republic, Feb. 10-14, 2014, 3 Pages.

\* cited by examiner

RESERVED RESOURCE POOL ASSISTED ACCESS RESOURCE SELECTION FOR SMALL DATA TRANSMISSION

CROSS REFERENCE TO RELATED APPLICATIONS

The present application claims priority to and the benefit of the U.S. Provisional Patent Application No. 62/133,365, filed Mar. 14, 2015, which is hereby incorporated by reference in its entirety as if fully set forth below and for all applicable purposes.

TECHNICAL FIELD

This application relates to wireless communication systems, and more particularly to improving uplink communications from communications devices such as "internet of everything" (IOE) devices to base stations (or other communication devices) that have access to a shared common pool of access resources. Certain embodiments can enable and provide wireless communication devices that efficiently use power resources, limit network interference, sustain appropriate user experience behavior, and support many numbers of wireless devices in a communications network paradigm.

INTRODUCTION

Data traffic on networks, such as cellular networks, has grown rapidly in recent years. This growth has been spurred on with the ever-increasing functionality of traditional mobile devices (such as cellular telephones/smartphones) as well as other connected devices such as tablets, laptop computers, and "smart terminals" such as IOE (also referred to as the "internet of things") devices. Some examples of smart terminals include devices that integrate sensors or meters to capture information that is then relayed to a remote system, such as a central server. This can include smart metering, temperature monitoring, pressure monitoring, fluid flow monitoring, inventory monitoring, water level monitoring, equipment monitoring, healthcare monitoring, wildlife monitoring, weather and geological event monitoring, fleet management and tracking, remote security sensing, physical access control, transaction-based business charging, and other applications.

Before these devices may transmit any data on a network, they must establish a radio link connection with the network that includes a lengthy signaling procedure for requesting use of an access resource (e.g., time and/or frequency elements in resource blocks) and a subsequent grant of the access resource from the base station. The amount of overhead and/or time required to establish a radio link connection using the access request/grant approach becomes a problem for IOE devices, which typically (given their nature) are embedded with devices or objects typically designed to consume low amounts of power and have low cost. For example, an IOE device (such as a smart meter for a utility) may be expected to last years without replacement or recharge (if recharging is possible).

BRIEF SUMMARY OF SOME EMBODIMENTS/EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Instead of access request/grant it may be more energy efficient to implement a grant-less transmission regime. For grant-less transmission, the IOE device directly starts transmission of its data (which is typically a small amount as compared to voice/video/etc.) without waiting for the base station (or other network element) to assign access resources. To enable this, a common pool having a finite number of access resources (such as frequencies, time slots, and/or codewords) may be maintained that the IOE devices uses to select one or more access resources from to begin the grant-less transmission.

Although there may be a relatively low probability of two or more IOE devices selecting the same access resource(s) from the common pool at the same time (referred to as a "collision"), situations sometimes occur that change this probability. For example, IOE devices that suffer from a large amount of path loss (such as caused by being located far from a base station and/or being deployed in a high-attenuation environment such as a basement or other structure(s)) require significantly longer transmission times than other IOE devices accessing the same common pool of access resources. As a result, the IOE device that requires a longer transmission time has a much higher probability of colliding with new transmissions from other IOE devices that attempt to use the same access resource(s) from the common pool. While increasing the common pool size may help reduce collision probability, it has the drawback of adding search complexity to the base station.

As a result, there is a need for techniques to reduce the probability of collisions when selecting access resources available in a common pool of access resources for grant-less transmissions in a network, such as a cellular network, while not increasing the search complexity at the base station. It is to the provision of such aspects and features that arrangements and embodiments of the technology discussed herein are directed.

For example, in an aspect of the disclosure, a method for wireless communication includes transmitting, from a first wireless communications device to a second wireless communications device, a first set of data using a first access resource selected from a common pool of access resources as part of a grant-less transmission; requesting, by the first wireless communications device, the second wireless communications device to provide a second access resource from a reserved access pool based on a metric; and transmitting, by the first wireless communications device, a second set of data to the second wireless communications device using the second access resource after transitioning to the second access resource.

In an additional aspect of the disclosure, a method for wireless communication includes searching, by a first wireless communications device, a common pool of access resources to recover a first set of data received from a second wireless communications device using a first access resource selected from the common pool of access resources as part of a grant-less transmission; receiving, at the first wireless communications device, a request from the second wireless communications device to provide a second access resource selected from a reserved access pool to the second wireless communications device; transmitting an identification of the second access resource selected from the reserved access pool to the second wireless communications device; and switching to the second access resource to recover a second set of data from the second wireless communications device without searching the reserved access pool.

In an additional aspect of the disclosure, a first wireless communications device includes a processor configured to select a first access resource from a common pool of access resources as part of a grant-less transmission to a second wireless communications device and, based on a metric, request the second wireless communications device to provide a second access resource from a reserved access pool; a transceiver configured to transmit a first set of data to the second wireless communications device using the first access resource, wherein the first set of data includes to the request for the second access resource in response to the determination, the transceiver being further configured to transmit a second set of data to the second wireless communications device using the second access resource.

In an additional aspect of the disclosure, a first wireless communications device includes a transceiver configured to receive a first set of data from a second wireless communications device, wherein the first set of data is transmitted using a first access resource selected from a common pool of access resources as part of a grant-less transmission from the second wireless communications device; a resource coordinator configured to search the common pool of access resources to recover the first set of data received from the second wireless communications device, wherein the transceiver is further configured to receive a request from the second wireless communications device to provide a second access resource selected from a reserved access pool and transmit an identification of the second access resource selected from the reserved access pool to the second wireless communications device; and a processor configured to switch the transceiver to the second access resource to recover a second set of data from the second wireless communications device without searching the reserved access pool.

In an additional aspect of the disclosure, a computer-readable medium having program code recorded thereon includes program code comprising code for causing a first wireless communications device to transmit, to a second wireless communications device, a first set of data using a first access resource selected from a common pool of access resources as part of a grant-less transmission; code for causing the first wireless communications device to request the second wireless communications device to provide a second access resource from a reserved access pool in response to a determination that the grant-less transmission exceeds a threshold; and code for causing the first wireless communications device to transmit a second set of data to the second wireless communications device using the second access resource after transitioning to the second access resource.

In an additional aspect of the disclosure, a computer-readable medium having program code recorded thereon includes program code comprising code for causing a first wireless communications device to search a common pool of access resources to recover a first set of data received from a second wireless communications device using a first access resource selected from the common pool of access resources as part of a grant-less transmission; code for causing the first wireless communications device to receive a request from the second wireless communications device to provide a second access resource selected from a reserved access pool to the second wireless communications device; code for causing the first wireless communications device to transmit an identification of the second access resource selected from the reserved access pool to the second wireless communications device; and code for causing the first wireless communications device to switch to the second access resource to recover a second set of data from the second wireless communications device without searching the reserved access pool.

In an additional aspect of the disclosure, a first wireless communications device includes means for transmitting, to a second wireless communications device, a first set of data using a first access resource selected from a common pool of access resources as part of a grant-less transmission; means for requesting the second wireless communications device to provide a second access resource from a reserved access pool in response to a determination that the grant-less transmission exceeds a threshold; and means for transmitting a second set of data to the second wireless communications device using the second access resource after transitioning to the second access resource.

In an additional aspect of the disclosure, a first wireless communications device includes means for searching a common pool of access resources to recover a first set of data received from a second wireless communications device using a first access resource selected from the common pool of access resources as part of a grant-less transmission; means for receiving a request from the second wireless communications device to provide a second access resource selected from a reserved access pool to the second wireless communications device; means for transmitting an identification of the second access resource selected from the reserved access pool to the second wireless communications device; and means for switching to the second access resource to recover a second set of data from the second wireless communications device without searching the reserved access pool.

Other aspects, features, and embodiments of the present disclosure will become apparent to those of ordinary skill in the art upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
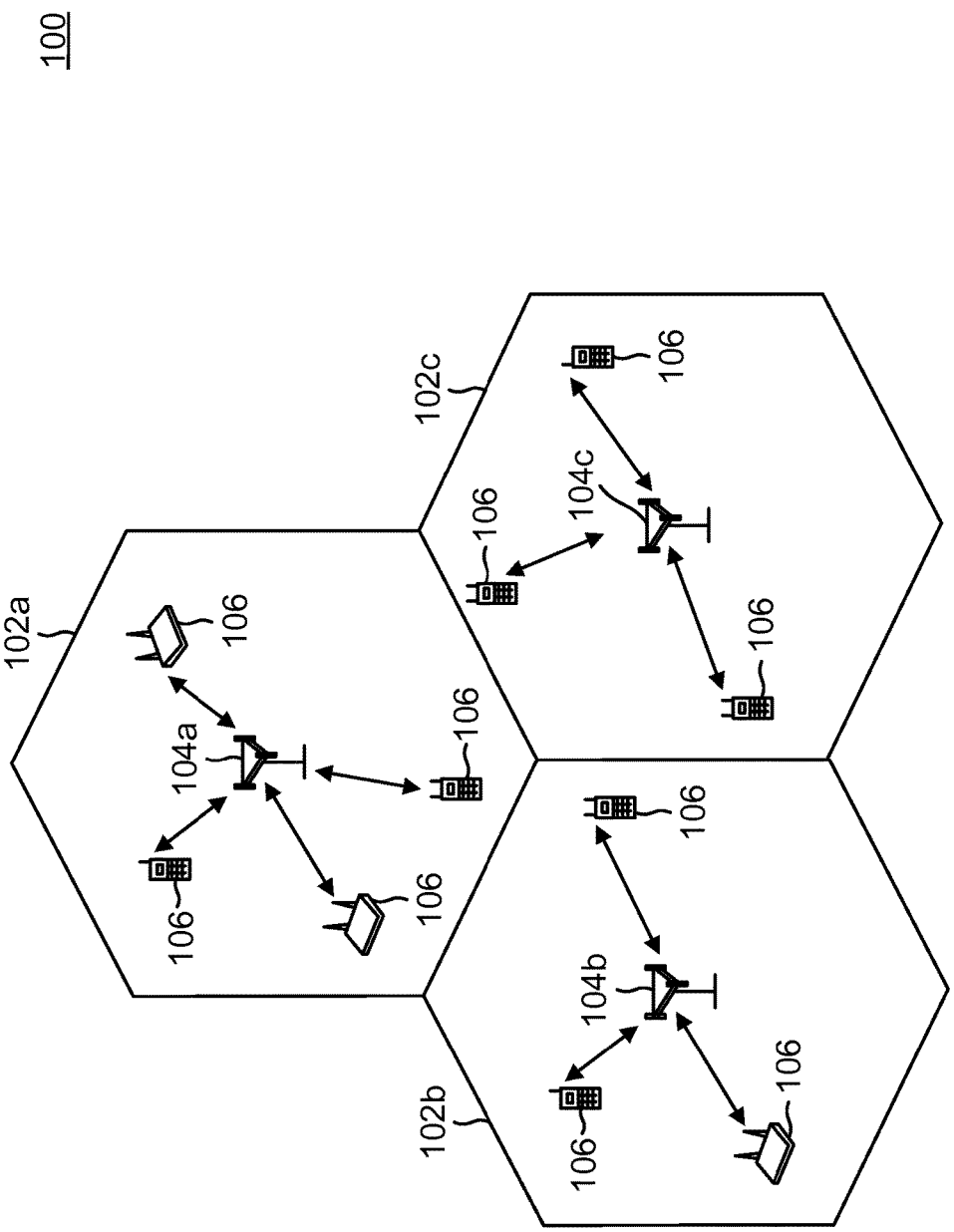
FIG. 1 is a diagram of an exemplary wireless communications environment according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new (E.G., 4G networks) releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

Embodiments of the present disclosure introduce systems and techniques to reduce a probability of collisions between communication devices. For example, certain features enable and provide collision reduction of communications between different internet of everything (IOE) devices that engage in grant-less transmissions to base stations. This can be accomplished while not increasing search complexities for network-side components, e.g. at a base station.

To accomplish this, two different pools of access resources are generally provided. First, a common pool of access resources which has a relatively small number of access resources, which the base station searches. Second, a reserved access pool of access resources which has a relatively large number of access resources that the base station does not search. The reserved access pool may be under the control of the base station, removing the possibility of collisions for those IOE devices that transition during transmission to access resources in the reserved access pool.

In some embodiments, an IOE device that has data to send randomly selects a first access resource from the common pool to use in transmitting the data to the base station in a grant-less transmission. If the IOE device predicts (e.g., based on some monitored metric(s) of the downlink) that the data transmission will not exceed a threshold (e.g., the received signal strength (RSS) of the downlink channel is less than a threshold value, signal-to-noise ratio (SNR) of the channel is greater than a threshold value, a data size is less than a threshold amount, and/or an estimated or actual transmission time does not exceed a predetermined amount), then the IOE device initiates and completes the transmission using the first access resource. If the IOE device predicts that the data transmission (e.g., some predicted metric of the transmission, such as time or the other metrics listed above) will exceed the threshold, the IOE device also includes a request for a second access resource from the reserved access pool. The IOE device includes the request as part of the transmission to the base station (e.g., a flag set in a header) to indicate to the base station that the second access resource is requested to continue communicating with the IOE device using a second access resource instead of the first access resource.

The base station responds to the request by locating an access resource from the reserved access pool that is not in use by another IOE device. This can avoid the possibility of collisions with IOE devices using access resources from the reserved access pool. The base station may identify the second access resource to the requesting IOE device (e.g., with information identifying what resource to use, if the IOE device maintains a copy of the reserved access pool for reference or with the actual parameters of the second access resource) in an acknowledgment message to the IOE device. After the IOE device receives the acknowledgment and accompanying information, the IOE device and the base station transition to the second access resource and complete the transmission using the second access resource. By switching to the second access resource, an IOE device that predicts a longer transmission time reduces the probability that another IOE device will randomly select the same access resource from the smaller common pool before the IOE device has completed its transmission. Further, this can be accomplished without adding to the search complexity at the base station (e.g., by adding many more access resources to the collision reduction pool that is not searched rather than to the common pool that is searched).

FIG. 1 illustrates a wireless communication network 100 in accordance with various aspects of the present disclosure. The wireless network 100 may include a number of base stations 104 and a number of user equipment (UE) 106, all within one or more cells 102 as illustrated in FIG. 1. The communications environment 100 may support operation on multiple carriers (e.g., waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The communications environment 100 may be a multi-carrier LTE network capable of efficiently allocating network resources. The communications environment 100 is one example of a network to which various aspects of the disclosure apply.

A base station 104 as discussed herein can have various characteristics. In some scenarios, it may include an evolved Node B (eNodeB) in the LTE context, for example. A base station 104 may also be referred to as a base transceiver station or an access point. It will be recognized that there could be one to many base stations, as well as be an assortment of different types such as macro, pico, and/or femto base stations. The base stations 104 may communicate with each other and other network elements via one or more backhaul links. The base stations 104 communicate with the UEs 106 as shown, including via direct wireless connections or indirect, e.g. via relay devices. A UE 106 may communicate with a base station 104 via an uplink and a downlink. The downlink (or forward link) refers to the communication link from a base station 104 to a UE 106. The uplink (or reverse link) refers to the communication link from a UE 106 to a base station 104.

The UEs 106 may be dispersed throughout the wireless network 100, and each UE 106 may be stationary or mobile. A UE may also be referred to as a terminal, a mobile station, a subscriber unit, etc. A UE 106 may be a cellular phone, a smartphone, a personal digital assistant, a wireless modem, a laptop computer, a tablet computer, entertainment device, medical device/equipment, biometric devices/equipment, fitness/exercise devices, vehicular components/sensors, etc. The wireless communication network 100 is one example of a network to which various aspects of the disclosure apply.

According to embodiments of the present disclosure, some of the UEs 106 may be internet of everything (IOE) devices, and reference herein will be made to IOE devices 106, though it will be recognized that this is done for purposes of simplicity only and that the base stations 104 may communicate with a variety of different types of devices at the same or different times. More or fewer IOE devices 106 than those shown may be deployed within the communications environment 100. IOE devices 106 may either be stand-alone or integrated within other devices. The IOE devices 106 may capture information that is then relayed to a remote system. IOE devices 106 may have limited power resources because they are integrated with devices or objects, such as to render those devices or objects "smart," and may need to be able to operate for long periods of time without replacement or recharge, e.g. days, weeks, months, or years. As a result, the IOE devices 106 may synchronize with a beacon that the base stations 104 periodically emit. As a result of this synchronization, each of the IOE devices 106 may only awake at predefined time intervals according to the beacon in order to decrease power consumption. In addition to communication with the base stations 104, the IOE devices 106 can be capable of linking to each other, for example via D2D (e.g., peer-to-peer and/or mesh) links. Further, aspects of the present disclosure may be applicable to other device types such as peripheral and/or central nodes or peer-to-peer between various device types.

The techniques described herein may be used for a single-input single-output (SISO) system, a single-input multiple-output (SIMO) system, a multiple-input single-output (MISO) system, and a multiple-input multiple-output (MIMO) system. These techniques may be used for a non-orthogonal-based system and for other multi-carrier communication systems. Further, embodiments of this disclosure are directed to any type of modulation scheme, but non-orthogonal waveforms are used for purposes of illustration. Non-orthogonal waveforms are useful according to embodiments of the present disclosure because often the IOE devices 106 have only small amounts of data to transmit during a given wake-up period, and other types of modulation would consume significantly more overhead and other resources, prematurely draining the battery life of the IOE devices 106. Also, the IOE devices 106 typically operate at low power ranges, resulting in less interference in shared frequencies/time slots than would occur with more powerful UEs 106. Non-orthogonal waveforms that rely on scrambling codes or interleaving may be used, for example, where the cells 102 are large and a frequency bandwidth has been dedicated for IOE device communications. Frequency may be relied upon, for example, in environments where the cells 102 have small coverage areas and the IOE devices 106 share the same bandwidth with other competing devices, such as other types of UEs.

As will be discussed in more detail below, an IOE device 106 first initiates a grant-less transmission by selecting an access resource from a common pool of access resources (e.g., randomly). Because other IOE devices 106 accessing the same base station 104 randomly select from the same common pool, there is a probability of collision that two IOE devices 106 randomly select the same access resource from the common pool. Often, the data that the IOE devices 106 are sending with the grant-less transmissions are sufficiently small (e.g., a few hundred bytes) that, even with a relatively low data rate, the IOE device 106 uses the selected access resource for a short duration (and, therefore, less probability that another IOE device 106 will randomly select the same access resource during the grant-less transmission). The short duration may correspond, for example, to a duration during which an access collision probability remains low, which may depend on several different factors such as a number of active devices (e.g., IOE devices 106) within an area (e.g., a cell), the traffic pattern of each device, etc. Situations may arise, however, that may cause the transmission to last longer, which increases the probability of access collision with another IOE device 106 that may randomly select the same access resource before the first IOE device 106 has finished its grant-less transmission. This situation may arise, for example, where the connection with the base station 104 is poor (e.g., significant path loss between the IOE device 106 and the base station 104, or the IOE device 106 is situated in a high-attenuation environment), an increase in the number of active devices within the cell, and the traffic pattern of each device to name some examples.

To address this problem, the common pool of access resources could be increased to have more access resources available for random selection. Doing so reduces the probability of collisions as each IOE device 106 randomly selects an access resource from the common pool. As the number of access resources in the common pool increases, however, the search complexity for the base station increases as well which becomes undesirable. Search complexity, as used herein, refers to the need of the base station 104 to repeatedly search through the different access resources (combinations of times and scrambling codes/interleaving permutations as discussed further below) as it receives grant-less transmissions from the various IOE devices 106 within its coverage. The base station 104 performs this searching because, due to the grant-less transmission, the base station 104 does not know when particular IOE devices 106 wake up or what access resources they select until the base station 104 receives a transmission. In an embodiment, the base station 104 searches by comparing a received grant-less transmission to each scrambling code or interleaver in the common pool of access resources in order to detect which particular scrambling code or interleaver results in a high energy output.

Because the search complexity increases as the size of the common pool of access resources increases, the common pool of access resources may be kept to a manageable size, thereby placing an upper bound on the level of search complexity at the base station but, at the same time, limiting how much the probability of collision may reduce. To address this continuing need to reduce the probability of collision, embodiments of the present disclosure provide an additional reserved access pool of access resources.

Figure 5:
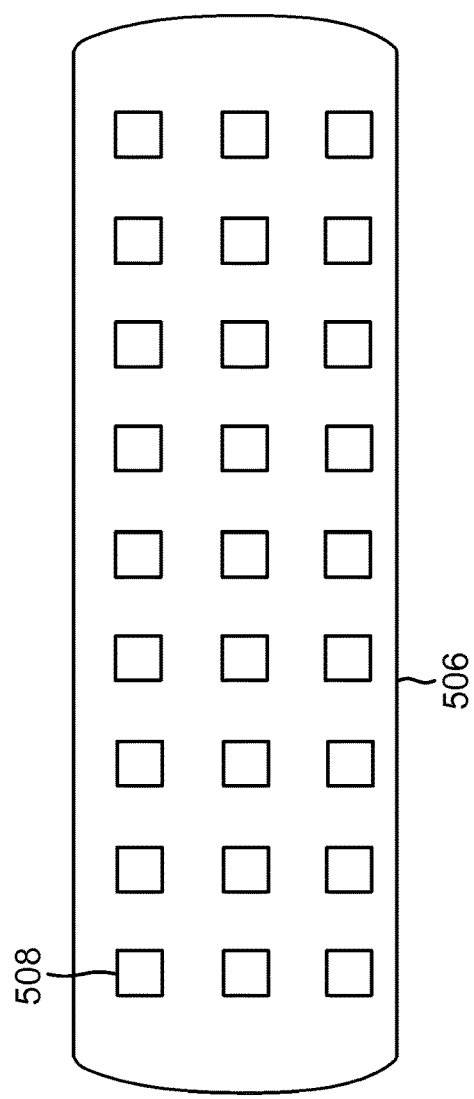
FIG. 5 is a diagram illustrating access resource pools for grant-less transmissions according to embodiments of the present disclosure.
Figure 5:
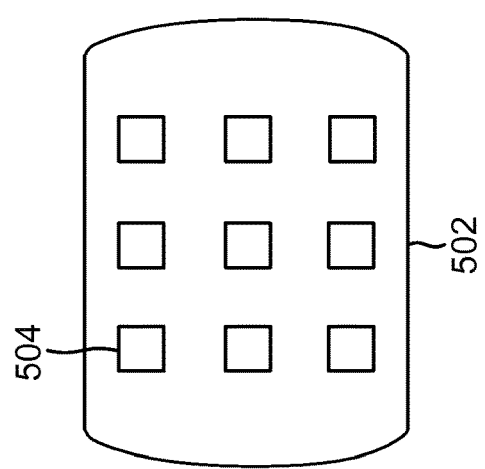

This is illustrated in FIG. 5, which shows a diagram illustrating access resource pools for grant-less transmissions according to embodiments of the present disclosure. In FIG. 5, a common pool 502 of access resources is illustrated as well as a reserved access pool of access resources. The common pool 502 has a smaller number of access resources 504 than the reserved access pool 506. Each access resource may be a pair of two resources, such as:

[scrambling code, access time]; or
[interleaver, access time].

A scrambling code is a particular bit sequence that can be used to scramble the data being transmitted to the base station 104, for example by multiplying the data bits with the scrambling code. An interleaver involves some permutation of the bits of the data being transmitted. These two pair alternatives are useful, for example, where non-orthogonal waveforms are used for the grant-less transmissions as described above. In embodiments where the cell 102 in FIG. 1 is small, another access resource could be the pair [frequency, access time] as will be recognized.

Returning to FIG. 5, the reserved access pool 506 of access resources is an additional pool of access resources 508 that is kept separate from the common pool 502. As illustrated in FIG. 5, there are significantly more access resources 508 in the reserved access pool 506 than access resources 504 in the common pool 502. As an example, there may be 10-30 times more access resources 508 in the reserved access pool 506 (e.g., 16 or 32 access resources in the common pool 502 versus 500 to 1000 in the reserved access pool 506). This is by way of example only; as will be recognized, other amounts may be maintained in each respective pool, with the number of access resources 508 in the reserved access pool 506 being greater than the number of access resources 504 in the common pool 502. The access resources 508 in the reserved access pool 506 may be in the same frequency band (e.g., where they are either the scrambling code or interleaver pairs) as the access resources 504 in the common pool 502, or alternatively be in different frequency bands. In an embodiment, the common pool 502 and the reserved access pool 506 do not share any access resource pairs in common. Thus, an IOE device 106 that has switched to using an access resource 508 from the reserved access pool 506 does not have any probability of collision with another IOE device 106 that randomly selects an access resource from the common pool 502, because no access resource pairs are common between the two.

According to embodiments of the present disclosure, the base station 104 may maintain the reserved access pool 506, e.g. by keeping track of which particular access resources 508 are in use by requesting IOE devices 106 at a given point in time. This may be done by metadata associated with each access resource 508, and/or by maintaining a lookup table or similar that the base station 104 may check at the time of each request and update when a particular access resource 508 (that is identified as available after the check) is identified and sent to the requesting IOE device 106 (e.g., either an identification of the resource or all parameters of the resource necessary for the requesting IOE device 106 to use based on the parameters). The base station 104 may further update the status of the access resource once the IOE device 106 using the access resource from the reserved access pool has completed its transmission, thereby releasing the particular resource again for use with another requesting IOE device 106.

Both the common pool 502 and the reserved access pool 506 may be received from the base station 104 at some prior point in time, for example as part of a system information block (SIB). These pools may then be stored in the IOE device 106, for example in the memory 204 described with respect to FIG. 2 below, and accessed as needed. For example, with respect to the reserved access pool 506, in particular, the IOE device 106 may maintain a copy so that, when requesting a second access resource from the base station 104 from the reserved access pool 506, the base station 104 may need to only identify the particular access resource from the reserved access pool 506 instead of a more complete set of parameters. This may reduce the amount of data that is consumed in the acknowledgment (or other transmission from the base station 104) that provides the requested second access resource 508 from the reserved access pool 506, since an identifying piece of information (e.g., a table location identifier) may be sent instead of more complete parameters that could be used without needing to refer to any particular pool. These pools may remain static during transmissions or, alternatively, be updated periodically with information received from the base station 104, for example as part of a synchronization message.

Continuing now with the example above for FIG. 1, when the situation arises that the IOE device 106 determines that the grant-less transmission will exceed some threshold metric (e.g., the received signal strength (RSS) of the downlink channel is less than a threshold value, signal-to-noise ratio (SNR) of the channel is less than a threshold value, a data size is bigger than a threshold amount, and/or an estimated or actual transmission time exceeds a predetermined amount), then the IOE device 106 further a request for an access resource from the reserved access pool 506 from the base station 104, which may operate as a management entity for allocation of the access resources 508 for multiple IOE devices 106 concurrently or at different times.

The IOE device 106 may include the request for the second access resource 508 from the reserved access pool 506 as a header in the grant-less transmission to the base station 104. In particular, the request may be included as part of the grant-less transmission to the base station 104 while using an access resource (one of the access resources 504) from the common pool 502. After the request is sent, the IOE device 106 may continue transmitting the data as part of the grant-less transmission until an acknowledgement (or other data transmission from the base station 104) is received from the base station 104 that identifies (or explicitly includes) a second access resource for the IOE device 106 to use from the reserved access pool 506. Upon receipt of this information, both the IOE device 106 and the base station 104 transition to the selected access resource 508 from the reserved access pool 506 and continue communication until the data is done transmitting.

According to embodiments of the present disclosure, the reserved access pool 506 eliminates the probability of collision between grant-less transmissions of IOE devices 106 that request use of a resource from the reserved access pool 506 while still limiting the search complexity for the base station 104. This is because the base station 104 focuses its repeated searching on the common pool 502 instead of the reserved access pool 506, where the reserved access pool 506 may have a significantly larger amount of access resources 508 than those available in the common pool 502. Specifically with respect to the reserved access pool 506, under the control of the base station 104 (or some other entity that is part of the base station 104 or another network entity in communication with the base station 104) no two requesting IOE devices 106 may be assigned the same access resource 508 from the reserved access pool 506, thereby eliminating the probability of collisions with respect to IOE devices 106 that request access resources 508 from the reserved access pool 506.

Figure 2:
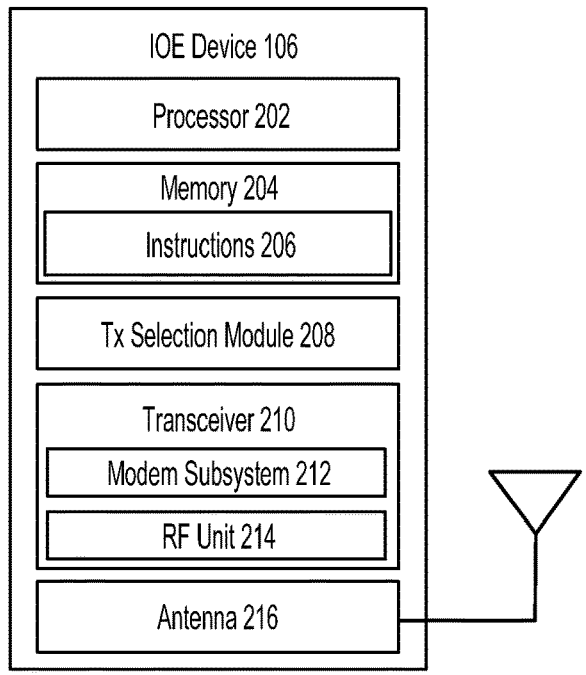
FIG. 2 is a block diagram of an exemplary communications device according to embodiments of the present disclosure.

FIG. 2 is a block diagram of an IOE device 106 according to embodiments of the present disclosure. The IOE device 106 may have any one of many configurations for various IOE applications described above. The IOE device 106 may include a processor 202, a memory 204, a transmission access resource selection module 208, a transceiver 210, and an antenna 216. These elements may be in direct or indirect communication with each other, for example via one or more buses.

The processor 202 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to the IOE devices 106 introduced above with respect to FIG. 1 and discussed in more detail below. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 442), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the IOE device 106 in connection with embodiments of the present disclosure. Instructions 206 may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The transmission access resource selection module 208 may be used to randomly select an access resource 504 from the common pool 502, as well as include a request for an access resource 508 from the reserved access pool 506, described above with respect to FIGS. 1 and 5. The transmission access resource selection module 208 may randomly select the access resource 504 for use in initiating a grant-less transmission to the base station 104. At the same time or at a later time, the transmission access resource selection module 208 may also request an access resource 508 from the reserved access pool 506 from the base station 104. The transmission access resource selection module 208 may include a request for the access resource 508 in response to first predicting or determining that the data to be transmitted will take a sufficiently long time that collisions with other IOE devices 106 become more likely (e.g., other IOE devices 106 may randomly select the same access resource 504 from the common pool 502 before the IOE device 106 completes transmission of its data).

For example, the transmission access resource selection module 208 may cooperate with other elements of the IOE device 106 to determine one or more parameters/metrics of one or both of a downlink from the base station 104 or an uplink to the base station 104. In one embodiment, the IOE device 106 monitors downlink information from the base station 104 (e.g., one or more broadcasts/beacons/other types of synchronization signals) to determine the RSS and/or SNR of the downlink channel. The transmission access resource selection module 208 may use this information to predict a quality (e.g., RSS, SNR, estimated total transmission time) of the uplink channel prior to the IOE device 106 initiating a grant-less transmission to the base station 104. The transmission access resource selection module 208 may further compare the prediction to one or more threshold values and determine, prior to initiating the grant-less transmission, to also include a request for a second access resource 508 from the reserved access pool 506 in its grant-less transmission to the base station 104 (where the reserved access 506 is managed, for example). In an embodiment, the transmission access resource selection module 208 may select/request both of the access resources 504/508 (respectively) at or near the same time. With the selection made, the IOE device 106 may initiate a grant-less transmission using the first selected access resource 504 from the common pool. As part of the transmission, the transmission access resource selection module 208 may cause the request to be included for the second access resource 508 to be selected/identified by the base station.

As another example, the transmission access resource selection module 208 may provide the first selected access resource 504 for use in initiating a grant-less transmission without also including a request for the second access resource 508 yet, based on a prediction that the transmission should be of sufficiently short duration that a has a lower probability of collision. As transmission starts, however, the IOE device 106 may monitor the uplink to the base station 104 and, based on the uplink quality and/or transmission duration, determine during transmission that the probability of collision is increasing beyond a threshold level (e.g., by determining a signal metric, data size metric, transmission time metric, etc.). This may trigger the transmission access resource selection module 208 to include a request for the second access resource 508 from the reserved access pool 506 from the base station 104 at that point in time in the transmission, for example as part of a header of the transmission. In this way, the request for an access resource 508 from the reserved access pool 506 is delayed until the transmission access resource selection module 208 determines that switching may be useful to reduce the probability of collision.

In either embodiment, the request may assume different forms, including for example a flag (either single- or multi-bit) included in a header of a grant-less transmission to the base station 104 or as part of the data payload. These are listed by way of example only.

The transceiver 210 may include a modem subsystem 212 and a radio frequency (RF) unit 214. The transceiver 210 is configured to communicate bi-directionally with other devices, such as base stations 104. The modem subsystem 212 may be configured to modulate and/or encode the data from the memory 204 and/or the transmission access resource selection module 208 (and/or from another source, such as some type of sensor) according to a modulation and coding scheme (MCS), e.g., a low-density parity check (LDPC) coding scheme, a turbo coding scheme, a convolutional coding scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a base station 104. Although shown as integrated together in transceiver 210, the modem subsystem 212 and the RF unit 214 may be separate devices that are coupled together at the IOE device 106 to enable the IOE device 106 to communicate with other devices.

The RF unit 214 may provide the modulated and/or processed data, e.g. data packets (or, more generally, data messages which may contain one or more data packets and other information), to the antenna 216 for transmission to one or more other devices. This may include, for example, transmission of data to a base station 104 according to embodiments of the present disclosure. The antenna 216 may further receive data messages transmitted from a base station 104 and provide the received data messages for processing and/or demodulation at the transceiver 210. Although FIG. 2 illustrates antenna 216 as a single antenna, antenna 216 may include multiple antennas of similar or different designs in order to sustain multiple transmission links.

Figure 3:
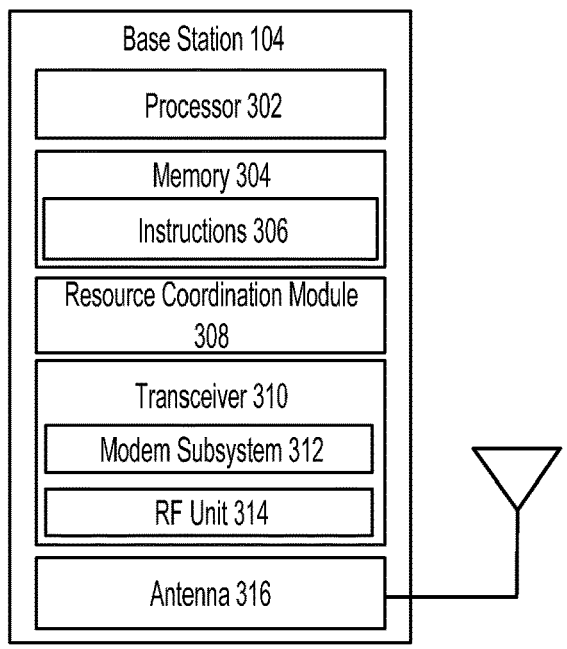
FIG. 3 is a block diagram of an exemplary base station according to embodiments of the present disclosure.

FIG. 3 is a block diagram of an exemplary base station 104 according to embodiments of the present disclosure. The base station 104 may include a processor 302, a memory 304, a resource coordination module 308, a transceiver 310, and an antenna 316. These elements may be in direct or indirect communication with each other, for example via one or more buses. The base station 104 may be an evolved Node B (eNodeB), a macro cell, a pico cell, a femto cell, a relay station, an access point, or another electronic device operable to perform the operations described herein with respect to the base station 104. The base station 104 may operate in accordance with one or more communication standards, such as a 3rd generation (3G) wireless communication standard, a 4th generation (4G) wireless communication standard, a long term evolution (LTE) wireless communication standard, an LTE-advanced wireless communication standard, or another wireless communication standard now known or later developed (e.g., a next generation network operating according to a 5G protocol).

The processor 302 may include a CPU, a DSP, an ASIC, a controller, a FPGA device, another hardware device, a firmware device, or any combination thereof configured to perform the operations described herein with reference to the base station 104 introduced in FIG. 1 above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the base station 104 in connection with embodiments of the present disclosure. Instructions 306 may also be referred to as code, which may be interpreted broadly to include any type of computer-readable statement(s) as discussed above with respect to FIG. 2.

The resource coordination module 308 may operate to search all of the scrambling codes, interleaver permutations, and/or frequencies maintained by the common pool 502 (e.g., a copy of which is stored in the memory 304 that matches the common pool 502 stored at the IOE devices 106) periodically or continuously to attempt to identify data streams that arrive from one or more IOE devices 106. According to embodiments of the present disclosure, the common pool 502 is kept to a relatively small size so as to limit the search complexity (and corresponding computing resources utilization) imposed on the base station 104. As noted previously, the search module 308 focuses its searching on the common pool 502 and does not search the reserved access pool 506.

The resource coordination module 308 may also operate to search and identify access resources 508 in the reserved access pool 506 responsive to requests from IOE devices 106. To assist in doing so, the resource coordination module 308 may also track the use of access resources 508, for example by way of metadata tracking, lookup table, or other type of database to name just a few examples. As described above, the resource coordination module 308 may track which access resources 508 from the reserved access pool 506 are in use and therefore cannot be identified in response to a new request. Further, the resource coordination module 308 may provide the identification (and/or other specific parameters for a selected access resource) to the processor 302 for inclusion in a transmission and update the system of the now-unavailable status for that selected access resource. Once the transmission is completed (or timed out, as will be recognized), the resource coordination module 308 may update its tracking information so that the particular access resource 308 is again available for selection responsive to a different request.

The transceiver 310 may include a modem subsystem 312 and a radio frequency (RF) unit 314. The transceiver 310 is configured to communicate bi-directionally with other devices, such as IOE devices 106 (and other types of UEs 106). The modem subsystem 312 may be configured to modulate and/or encode data according to a MCS, some examples of which have been listed above with respect to FIG. 2. The RF unit 314 may be configured to process (e.g., perform analog to digital conversion or digital to analog conversion, etc.) of modulated/encoded data from the modem subsystem 312 (on outbound transmissions) or of transmissions originating from another source, such as an IOE device 106. Although shown as integrated together in transceiver 310, the modem subsystem 312 and the RF unit 314 may be separate devices that are coupled together at the base station 104 to enable the base station 104 to communicate with other devices.

The RF unit 314 may provide the modulated and/or processed data, e.g. data packets, to the antenna 316 for transmission to one or more other devices such as IOE devices 106. The modem subsystem 312 may modulate and/or encode the data in preparation for transmission. The RF unit 314 may receive the modulated and/or encoded data packet and process the data packet prior to passing it on to the antenna 316. This may include, for example, transmission of data messages to IOE devices 106 or to another base station 104, according to embodiments of the present disclosure. The antenna 316 may further receive data messages transmitted from IOE devices 106 and/or other UEs 106, and provide the received data messages for processing and/or demodulation at the transceiver 310. Although FIG. 3 illustrates antenna 316 as a single antenna, antenna 316 may include multiple antennas of similar or different designs in order to sustain multiple transmission links.

Figure 4:
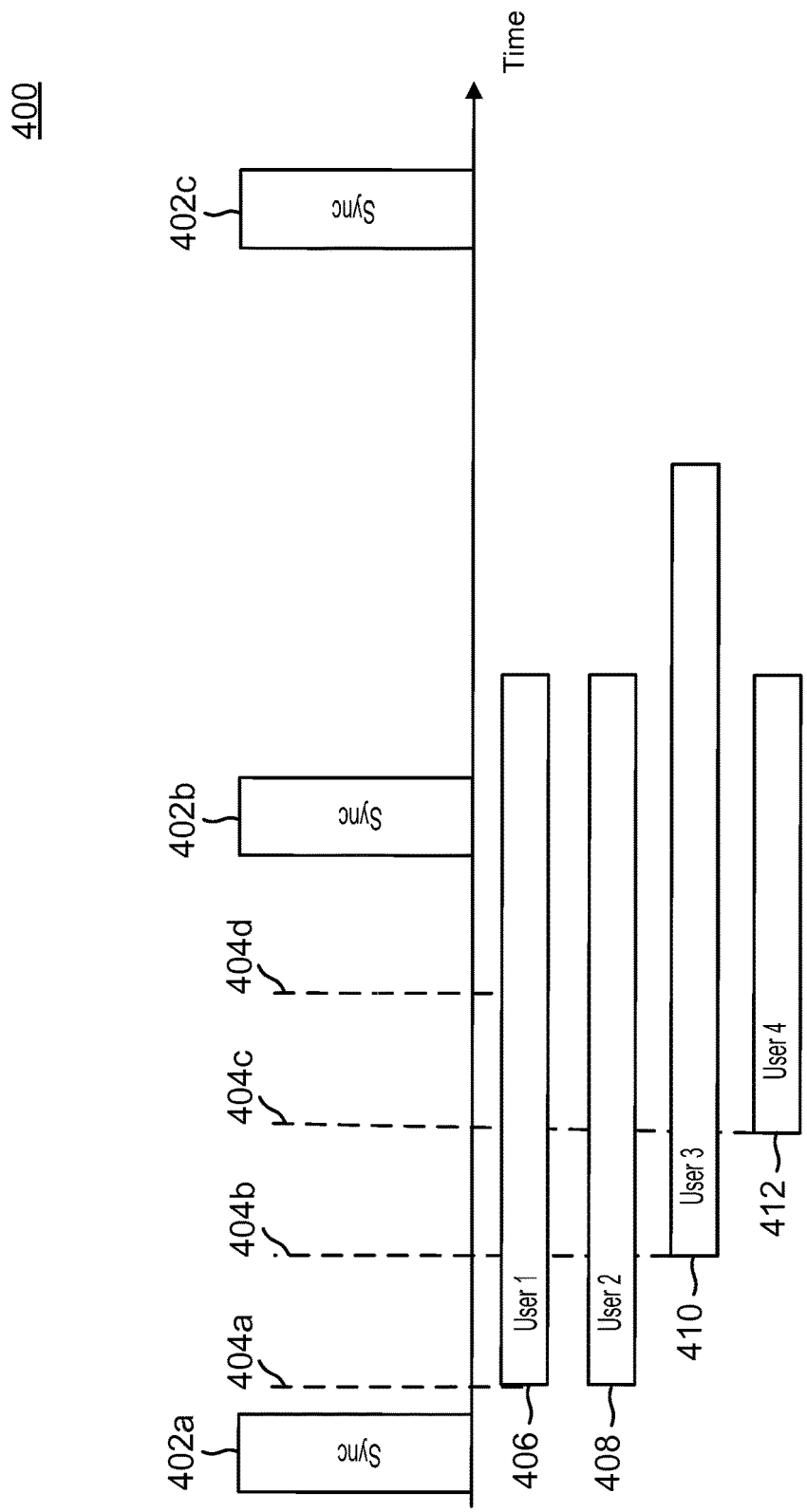
FIG. 4 is a diagram illustrating grant-less transmissions according to embodiments of the present disclosure.

FIG. 4 is a diagram 400 illustrating grant-less transmissions according to embodiments of the present disclosure. FIG. 4 illustrates four different IOE devices 106—IOE device 406 (user 1), IOE device 408 (user 2), IOE device 410 (user 3), and IOE device 412 (user 4) that initiate grant-less transmissions to a base station 104. As will be recognized, the four IOE devices shown are for ease in simplicity of illustration—more or fewer may initiate grant-less transmissions at given points in time according to embodiments of the present disclosure.

As shown in FIG. 4, a synchronization message 402a is transmitted from a base station 104 (e.g., a beacon) that the IOE devices 406-412 periodically wake up and synchronize with. In FIG. 4, each of the IOE devices 406-412 has data to transmit. After synchronization, each of the IOE devices 406-412 randomly selects an access resource 504 from the common pool 502. As each access resource 504 has an access time associated with it, each IOE device 406-412 may initiate its particular transmission at a different time.

For example, IOE devices 406 and 408 start their grant-less transmissions at access time 404a, due to each randomly selecting access resources 504 that have the same access time 404a. Since each IOE device 406 and 408 randomly select access resources 504, there is some probability that each will select the same access resource but also some probability that they will not. Thus, although each IOE device 406 and 408 selected access resources 504 that had the same access time, they may still have randomly selected different access resources 504 with respect to the particular scrambling code or interleaver permutation associated with the access time.

Continuing with the example of FIG. 4, IOE device 410 starts its grant-less transmission at access time 404b, due to randomly selecting an access resource 504 from the common pool 502 that has the access time 404b. Further, IOE device 412 starts its grant-less transmission at access time 404c, due to randomly selecting an access resource 504 from the common pool 502 that has the access time 404c. As illustrated in FIG. 4, the total transmission times for IOE devices 406-410 is longer than the total transmission time for IOE device 412.

Looking at IOE device 406 as a specific example, prior to initiating transmission the IOE device 406 may have already predicted that a transmission metric for the transmission would exceed a predetermined threshold (e.g., based on RSS, SNR, data size, bit rate, such as estimated for the uplink from a downlink measurement, and/or a total transmission time to name just a few examples). As such, the IOE device 406 may include a request for identification/selection of a second access resource 508 from the reserved access pool 506 from the base station 104. The IOE device 406 may request the second access resource from the reserved access pool 506 after or at approximately the same time of selection of the access resource 504. With the transmission initiated at access time 404a, the IOE device 406 may have included as part of its data the request for the base station 104 to identify a second access resource 508 that the IOE device 106 switch to using. The base station 104 can respond with an acknowledgment that includes an identification of a second access resource 508 from the reserved access pool 506. As a result, the base station 104 and the IOE device 406 communicate briefly using the first access resource 504 but then switch to the second access resource 508 after the acknowledgment to continue transmitting the data to the base station 104 until completion. In an embodiment, the IOE device 106 and the base station 104 switch to the second access resource 508 after the acknowledgment is received. In another embodiment, either the IOE device 106 or the base station 104 may specify a particular number of subframes and/or period of time to wait before switching.

Looking now at the IOE device 412 as another specific example with a shorter transmission time, prior to initiating transmission the IOE device 412 may have already predicted that a transmission metric would not exceed a threshold. As a result, the IOE device 412 may initiate and complete the grant-less transmission of its data using just the selected access resource 504 from the common pool 502.

As another example, the IOE device 410 may initially predict (e.g., based on some measured quality of its downlink from the base station 104 and/or amount of data to be transmitted) that the uplink would not exceed a predetermined threshold and, therefore, not include a request for a second access resource 508 from the reserved access pool 506 maintained by the base station 104. However, as the transmission commences, the IOE device 408 may determine that there is an asymmetry between the downlink and uplink, such that the transmission via the uplink is taking longer than predicted (and/or desired), increasing the probability of a collision with another IOE device 106 that may subsequently wake up and randomly select the same access resource 504 from the common pool 502. As a result, the IOE device 410 may, upon this determination, include a request at the current stage of the transmission to request a second access resource 508 from the reserved access pool 506 from the base station 104. The IOE device 410 may then switch during the transmission to the second access resource 508 upon receipt of an acknowledgement from the base station 104 identifying a second access resource 508 (and, in some embodiments, after a specified number of subframes or time), thereby again reducing the probability of a collision as the transmission is completed.

Figure 6:
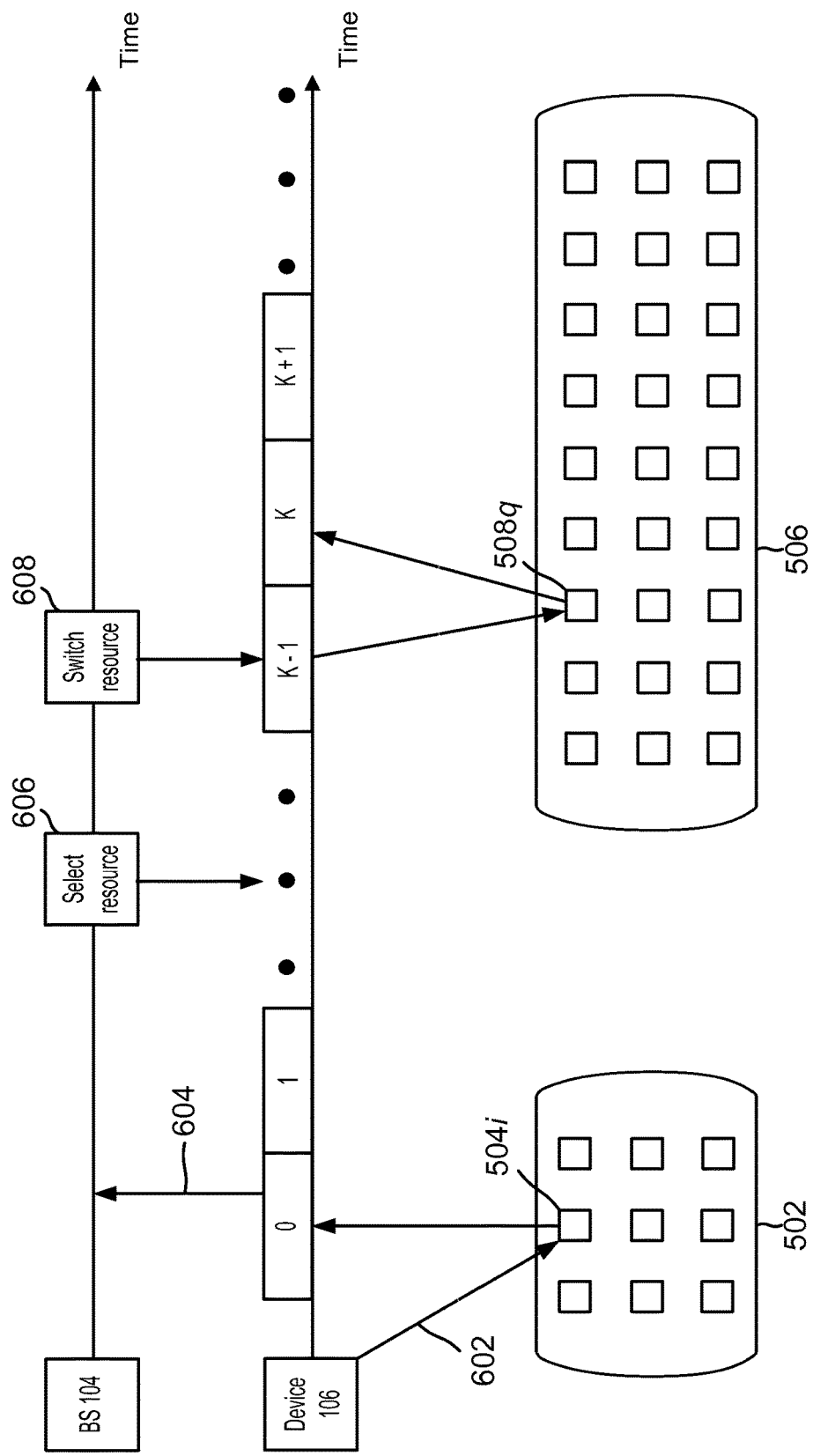
FIG. 6 is a diagram of grant-less transmission communications between devices according to embodiments of the present disclosure.

An exemplary communications flow that further illustrates the examples in FIG. 4 is shown in FIG. 6, which illustrates a diagram of grant-less transmission communications between an IOE device 106 and a base station 104 according to embodiments of the present disclosure. As shown, FIG. 6 illustrates communications after the IOE device 106 has received a synchronization message 402 (and after receiving a SIB that contained the common pool 502 and reserved access pool 506).

To begin a grant-less communication, the IOE device 106 randomly selects at action 602 the $i^{th}$ access resource 504 from among the access resources 504 in the common pool 502. The IOE device 106 initiates the grant-less communication with the base station 104 at action 604 using the selected access resource 504$i$ (e.g., starting with frames 0, 1, . . . etc.). If the amount of data to be transmitted is small and/or the uplink has sufficient quality, the transmission of the data takes a small enough amount of time that the IOE device 106 completes the grant-less transmission using the selected access resource 504*i* without switching to a second access resource 508 from the reserved access pool 506.

The amount of data to be transmitted may be larger and/or the uplink quality poor enough that transmission of the data may take more time and, therefore, increase the probability of collision. In embodiments where the IOE device 106 predicts that this will occur prior to initiating the grant-less transmission, the IOE device 106 may also include a request for a second access resource 508 that is transmitted with the data to the base station 104 at action 604.

After the base station 104 receives the transmission that includes the request for a second access resource 508, the base station 104 checks the reserved access pool 506 for available access resources 508, such as access resource 508*q* (as an example) at action 606. The searching may be of the pool itself or of one or more associated tracking mechanisms (e.g., metadata, table, linked list, database, etc.). During this time, the IOE device 106 continues transmitting data in subframes using the access resource 504*i*. With the access resource 508*q* selected, the base station 104 may transmit an acknowledgement or other message to the IOE device 106 that identifies (or provides all necessary details about so that the IOE device 106 does not need to do anything more than implement the details in the message) the access resource 508*q* as reserved and available for the IOE device 106 to use for continuing the transmission.

The base station 104 at action 608 switches to using the second selected access resource 508*q* at the same time as the IOE device 106. The IOE device 106 then continues the transmission using the second selected access resource 508*q* until the transmission is complete. As a result, the probability of collision between IOE devices 106 selecting the same access resource 504 from the common pool 502 is eliminated (since the second access resource 508*q* is reserved for the IOE device 106 and is not selected for use by any other IOE devices during that time), while also preventing the common pool 502 from being so large as to impose an excess burden in terms of search complexity at the base station 104.

As an alternative example, in embodiments where the IOE device 106 does not predict that collision is more likely to occur (e.g., based on a predicted transmission time or other transmission metric exceeding a predetermined threshold) prior to initiating a grant-less transmission, embodiments of the present disclosure may still be realized. For example, as the transmission commences using the access resource 504*i* without having also requested a second access resource 508 from the reserved access pool 506, the IOE device 106 may monitor the uplink and/or transmission time and compare the metric to a threshold. If the threshold is exceeded, or is predicted to be exceeded based on changing information of the uplink and/or transmission time, the IOE device 106 may then proceed with requesting the second access resource 508.

Once the determination is made to request the second access resource 508, the IOE device 106 may include the request with the current data segment being transmitted to the base station 104. Upon receiving an acknowledgement from the base station 104 (e.g., as part of action 606) that identifies a selected access resource 508*q* from the reserved access pool 506, the base station 104 and the IOE device 106 may switch to the second access resource 508*q* as described above.

Figure 7:
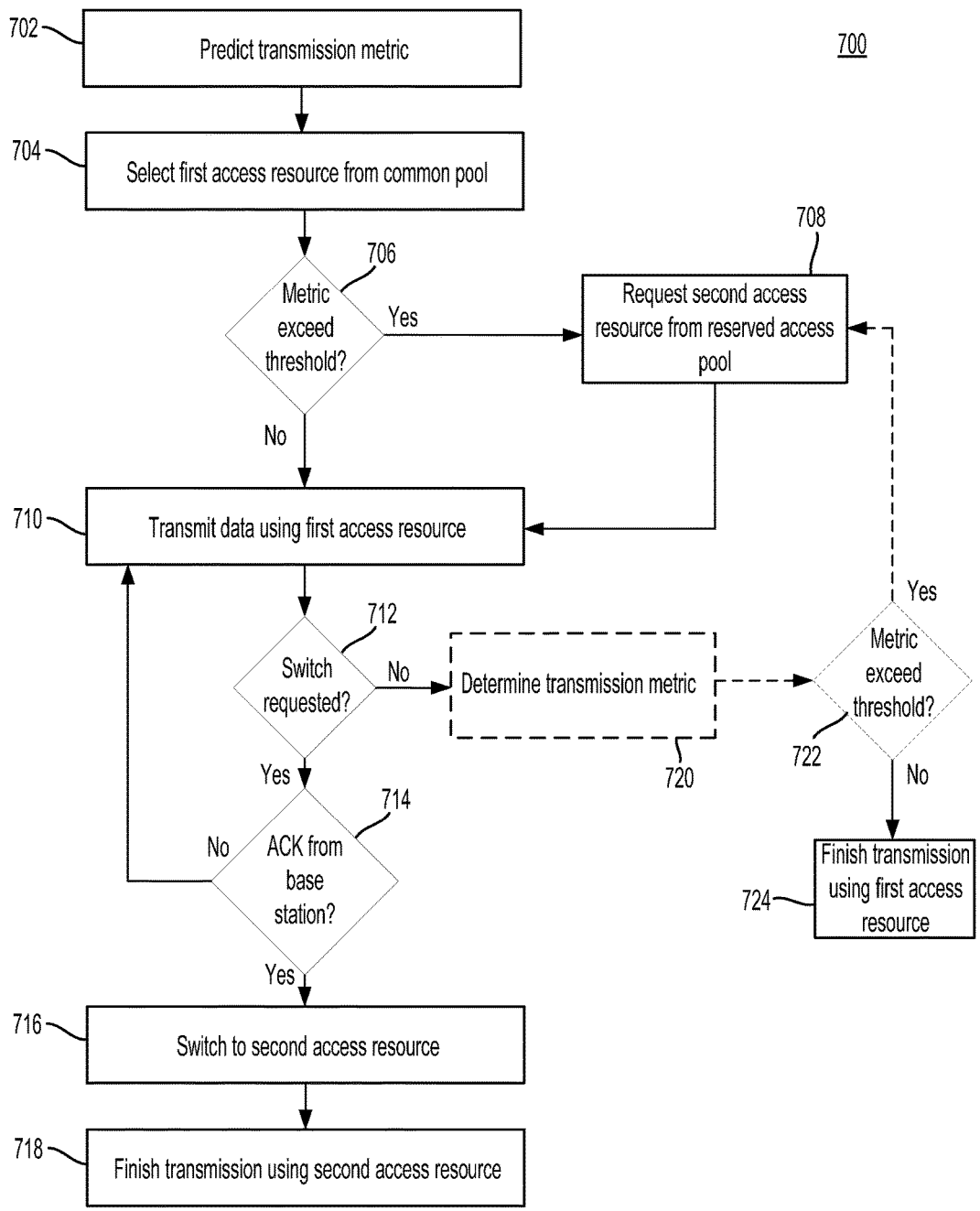
FIG. 7 is a flowchart illustrating an exemplary method for reducing collisions in grant-less transmissions according to embodiments of the present disclosure.

FIG. 7 is a flowchart illustrating an exemplary method 700 for reducing collisions in grant-less transmissions according to embodiments of the present disclosure. The method 700 may be implemented in the IOE device 106. The method 700 will be described with respect to a single IOE device 106 for simplicity of discussion, though it will be recognized that the aspects described herein may be applicable to a plurality of IOE devices 106, including a network of IOE devices. It is understood that additional method blocks can be provided before, during, and after the blocks of method 700, and that some of the blocks described can be replaced or eliminated for other embodiments of the method 700.

At block 702, prior to the initiation of a grant-less transmission, the IOE device 106 predicts a transmission metric for the uplink. For example, IOE device 106 may use a transmission access resource selection module 208 in cooperation with other elements of the IOE device 106 to determine one or more parameters/metrics of a downlink from the base station 104. This may include, for example, monitoring downlink information from the base station 104 (e.g., one or more broadcasts/beacons/other types of synchronization signals) to determine the RSS, SNR, bit rate, etc. of the downlink. The IOE device 106 may use this information to predict one or more transmission metrics for the uplink, including for example predicting an estimated transmission time based on the data size and predicted uplink metrics (or measured downlink metrics). In addition or in the alternative, the IOE device 106 may analyze the size of data to be transmitted as the transmission metric.

At block 704, the IOE device 106 randomly selects a first access resource 504 from the common pool of access resources 502. The IOE device 106 uses this first access resource 504 when it begins transmitting its data.

At decision block 706, the IOE device 106 determines whether the predicted transmission metric exceeds a threshold (which may involve a value above the threshold or below the threshold, depending on the threshold type). For example, the IOE device 106 may compare the predicted metric against one or more threshold values to assist in determining whether it may be useful to transition from the first access resource 504 from the common pool 502 to a second access resource 508 from the reserved access pool 506 during the transmission. For example, the threshold may be a RSS threshold, a SNR threshold, a bit rate threshold, a data size threshold, and/or a predicted transmission time threshold to name just a few examples.

If, as a result of the decision block 706, it is determined that the predicted metric exceeds the threshold, the method 700 proceeds to block 708. At block 708, the IOE device 106 requests a second access resource 508 from the reserved access pool 506, which as described above can be significantly larger than the common pool 502. In an embodiment, the IOE device 106 may include the request in the transmission at a beginning of the transmission or sometime thereafter.

At block 710, the IOE device 106 initiates a grant-less transmission with the base station 104 using the first access resource 504 that was selected at block 704. If it is determined, at step 706, that the predicted metric exceeds or will exceed the threshold, then the grant-less transmission at block 710 can include the request to the base station 104 (from block 708) to provide a second access resource 508. If it is determined, at block 706, that the predicted metric does not exceed or will not exceed the threshold, then the method 700 can proceed to block 710 without generating a request for a second access resource 508 from the reserved access pool 506 (block 708). As a result, block 708 can be skipped.

At decision block 712, if a second access resource 508 is requested (and, therefore, a switch is planned), then the method 700 proceeds to decision block 714.

At decision block 714, the IOE device 106 determines whether the it has received an acknowledgement (or other type of transmission suitable for the purpose) from the base station 104 that includes an identification of the second access resource 508 for the IOE device 106 to subsequently use for the rest of the data of the transmission. If the IOE device 106 has not received an acknowledgement (or related message) yet, then method 700 returns to block 710 to continue transmitting the data. If the IOE device 106 has received the acknowledgment, then the method 700 proceeds to block 716.

At block 716, the IOE device 106 switches to the second access resource 508 (at the same subframe as the base station 104, as specified in the acknowledgement or otherwise).

At block 718, the IOE device 106 continues transmitting the data using the second access resource 508 instead of the first access resource 504. The IOE device 106 can continue transmitting the data using the second access resource 508 until the transmission is completed.

Returning to decision block 712, if no switch is planned, the method 700 proceeds either to optional block 720 or to block 724. At block 724, the IOE device 106 finishes transmitting the data using the first access resource 504. This may occur, for example, because the amount of data is small and/or the transmission time (based on uplink quality and/or data size, for example) does not exceed a time threshold and, therefore, does not have an increasing probability of collision as occurs with transmissions that take longer.

Focusing now on the optional block 720, it is also possible that during transmission using the first access resource 504, the IOE device 106 may still determine (dynamically, during the transmission) that some transmission metric (or multiple metrics) has or is predicted to exceed one or more thresholds. Thus, at block 720 the IOE device 106 determines a transmission metric. To do so, the IOE device 106 may monitor the uplink to the base station 104 and, based on the uplink quality and/or transmission duration, determine one or more transmission metrics such as those described at block 702.

At optional decision block 722, the IOE device 106 determines whether the measured (or predicted/calculated) metric exceeds the threshold, similar to the description above with respect to decision block 706. In this manner, the IOE device 106 determines whether during transmission the metric (and, indirectly, the probability of collision) has transitioned (or is predicted to transition) beyond a threshold level (e.g., by determining a signal metric, data size metric, transmission time metric, etc.).

If the metric exceeds (or is now predicted to exceed) the threshold, then the method 700 proceeds to block 708 where the IOE device 106 requests a second access resource 508 from the reserved access pool 506 from the base station 104 and proceeds as described above with respect to blocks 708-712 and so on.

Returning to optional decision block 722, if the metric does not exceed (or is not predicted to exceed) the threshold, then the method 700 proceeds to block 724 that operates as described above.

As a result of the above, the probability of a collision is significantly reduced (and eliminated when using the reserved access pool 506) because of the larger pool of available access resources in the reserved access pool 506 compared to the number of available access resources in the common pool 502. Further, this is accomplished without significantly adding to the search complexity at the base station 104, because the base station 104 still searches the common pool 502, without including the reserved access pool 506, where the common pool 502 has not been expanded.

Figure 8:
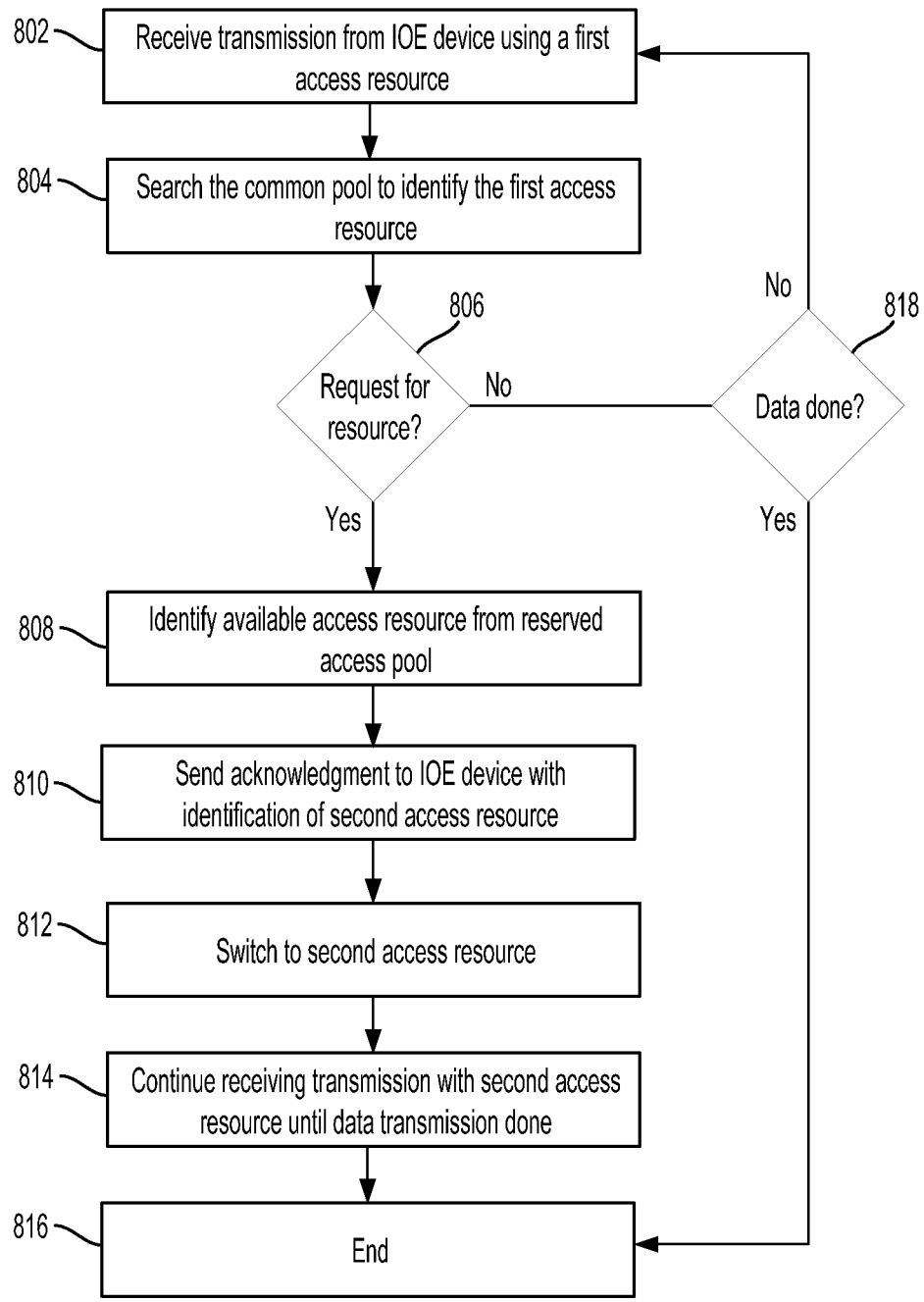
FIG. 8 is a flowchart illustrating an exemplary method for reducing collisions in grant-less transmissions according to embodiments of the present disclosure.

FIG. 8 is a flowchart illustrating an exemplary method 800 for reducing collisions in grant-less transmissions according to embodiments of the present disclosure. The method 800 may be implemented in the base station 104. The method 800 will be described with respect to a single base station 104 in communication with a single IOE device 106 for simplicity of discussion, though it will be recognized that the aspects described herein may be applicable to a plurality of IOE devices 106 and/or base stations 104. It is understood that additional method blocks can be provided before, during, and after the blocks of method 800, and that some of the blocks described can be replaced or eliminated for other embodiments of the method 800.

At block 802, the base station 104 receives a grant-less transmission from an IOE device 106 using a first access resource. As described with respect to the various figures above, the IOE device 106 randomly selects the first access resource 504 from the common pool 502, where the base station 104 may have previously transmitted the common pool 502 (and a copy of the reserved access pool 506) at some prior point in time, for example as part of a system information block (SIB).

At block 804, the base station 104 searches the common pool 502 in order to identify the first access resource 504 from common pool 502 used to transmit the data (and, thereby, to be able to process the transmission). According to embodiments of the present disclosure, the number of access resources in the common pool 502 is kept to a manageable amount so as to prevent the search complexity from increasing for the base station 104. The base station 104 performs this searching because, due to the grant-less transmission, the base station 104 does not know when particular IOE devices 106 wake up or what access resources they select until the base station 104 receives a transmission. In an embodiment, the base station 104 searches by comparing a received grant-less transmission to each scrambling code or interleaver in the common pool of access resources in order to detect which particular scrambling code or interleaver results in a high energy output.

At decision block 806, the base station 104 determines whether a request for a second access resource 508 from the reserved access pool 506 was included in the transmission from the IOE device 106.

If a request was included, then the method 800 proceeds to block 808 where the base station 104 analyzes the reserved access pool 506 to identify an available access resource 508 that the IOE device 106 may use. If a request was not included, then the method 800 proceeds to decision block 818, where the base station determines whether the data transmission has completed. If the data transmission has not completed, then the method 800 returns to block 802 to continue receiving the grant-less transmission and proceeds as described above (and further below). If, instead, the data transmission has completed then the method 800 proceeds to block 816 and ends.

Returning to block 808, the method 800 proceeds to block 810. At block 810, the base station 104 sends an acknowledgement to the requesting IOE device 106 with an identification of the selected second access resource 508 that the IOE device 106 may use to continue the current transmission without further risk of collision from other grant-less transmissions. The acknowledgement may include an identifier that the IOE device 106 may use to locate the identified access resource 508 from its local copy of the reserved access pool 506. Alternatively, the acknowledgement may include sufficient information about the selected access resource 508 that the IOE device 106 may be able to begin communicating using that resource without reference to a local copy of the reserved access pool 506. In another embodiment, the base station 104 (or the IOE device 106) may additionally specify a delay (a number of frames or period of time, for example) before switching to the second access resource 508.

At block 812, the base station 104 switches to the second access resource 508 identified in the acknowledgement (or other message).

At block 814, the base station 104 continues receiving data in the transmission using the second access resource 508 until the transmission is completed, at which point the method 800 proceeds to block 816 and ends.

As a result of the above, the base station 104 avoids further additions to search complexity because the common pool 502 is kept to a manageable size, while the probability of collision is significantly reduced (and eliminated when using the reserved access pool 506) because of the larger pool of available access resources in the reserved access pool 506 (that the base station 104 does not search) compared to the number of available access resources in the common pool 502.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

Embodiments of the present disclosure include a computer-readable medium having program code recorded thereon, the program code comprising code for causing a first wireless communications device to transmit, to a second wireless communications device, a first subset of data using a first access resource selected from a common pool of access resources as part of a grant-less transmission. The program code further comprises code for causing the first wireless communications device to request the second wireless communications device to provide a second access resource from a reserved access pool in response to a determination that the grant-less transmission exceeds a threshold. The program code further comprises code for causing the first wireless communications device to transmit a second subset of the data to the second wireless communications device using the second access resource after transitioning to the second access resource.

The computer-readable medium further includes code for causing the first wireless communications device to receiving an acknowledgement from the second wireless communications device of the request, the acknowledgement comprising an identification of the second access resource. The computer-readable medium further includes code for causing the first wireless communications device to select the first access resource before the transmitting the first subset of the data. The computer-readable medium further includes wherein the first access resource is selected randomly from the common pool. The computer-readable medium further includes wherein copies of the common pool and the reserved access pool are stored in a memory of the first wireless communications device. The computer-readable medium further includes code for causing the first wireless communications device to complete the transmitting using the second access resource, wherein the second subset of the data includes a remaining amount of the data. The computer-readable medium further includes code for causing the first wireless communications device to analyze a downlink message from the second wireless communications device prior to initiating the transmission of the first subset of the data; code for causing the first wireless communications device to predict a transmission metric for the transmission of the data based at least in part of the analysis of the downlink message; and code for causing the first wireless communications device to compare the predicted transmission metric with the threshold to determine if the predicted transmission metric exceeds the threshold. The computer-readable medium further includes code for causing the first wireless communications device to determine a transmission metric during the transmitting of the first subset of the data; code for causing the first wireless communications device to compare the determined transmission metric with the threshold during the transmitting of the first subset of the data to determine if the determined transmission metric exceeds the threshold; and code for causing the first wireless communications device to include, as part of the first subset of the data, the request for the second wireless communication device to provide the second access resource in response to the comparing. The computer-readable medium further includes wherein the common pool of access resources and the reserved access pool each comprises at least one of scrambling code/access time pairs or interleaver/access time pairs. The computer-readable medium further includes wherein the first wireless communications device is an Internet of Everything (IOE) device and the second wireless communications device is a base station.

Embodiments of the present disclosure further include a computer-readable medium having program code recorded thereon, the program code comprising code for causing a first wireless communications device to search a common pool of access resources to recover a first subset of data received from a second wireless communications device using a first access resource selected from the common pool of access resources as part of a grant-less transmission. The program code further comprises code for causing the first wireless communications device to receive a request from the second wireless communications device to provide a second access resource selected from a reserved access pool to the second wireless communications device. The program code further comprises code for causing the first wireless communications device to transmit an identification of the second access resource selected from the reserved access pool to the second wireless communications device. The program code further comprises code for causing the first wireless communications device to switch to the second access resource to recover a second subset of the data from the second wireless communications device without searching the reserved access pool.

The computer-readable medium further includes code for causing the first wireless communications device to maintain the reserved access pool comprising a first subset of access resources of the reserved access pool that are available and a second subset of access resources that are not available; and code for causing the first wireless communications device to select the second access resource from among the first subset of access resources in response to receiving the request from the second wireless communication device. The computer-readable medium further includes code for causing the first wireless communications device to transmit the identification of the second access resource as part of an acknowledgement of the request. The computer-readable medium further includes code for causing the first wireless communications device to receive the request as part of the first subset of the data from the second wireless communications device. The computer-readable medium further includes code for causing the first wireless communications device to receive the request using the first access resource after receiving at least a portion of the first subset of the data. The computer-readable medium further includes wherein the common pool of access resources and the reserved access pool each comprises at least one of scrambling code/access time pairs or interleaver/access time pairs. The computer-readable medium further includes code for causing the first wireless communications device to determine a range of access resources to include in the common pool of access resources and in the reserved access pool. The computer-readable medium further includes code for causing the first wireless communications device to transmit copies of the determined common pool of access resources and the reserved access pool to the second wireless communications device. The computer-readable medium further includes wherein the first wireless communications device is a base station and the second wireless communications device is a user equipment.

Embodiments of the present disclosure further include a first wireless communications device comprising means for transmitting, to a second wireless communications device, a first subset of data using a first access resource selected from a common pool of access resources as part of a grant-less transmission. The first wireless communications device further comprises means for requesting the second wireless communications device to provide a second access resource from a reserved access pool in response to a determination that the grant-less transmission exceeds a threshold. The first wireless communications device further comprises means for transmitting a second subset of the data to the second wireless communications device using the second access resource after transitioning to the second access resource.

The first wireless communications device further includes means for receiving an acknowledgement from the second wireless communications device of the request, the acknowledgement comprising an identification of the second access resource. The first wireless communications device further includes means for selecting the first access resource before the transmitting the first subset of the data. The first wireless communications device further includes wherein the first access resource is selected randomly from the common pool. The first wireless communications device further includes wherein copies of the common pool and the reserved access pool are stored in a memory of the first wireless communications device. The first wireless communications device further includes means for completing the transmitting using the second access resource, wherein the second subset of the data includes a remaining amount of the data. The first wireless communications device further includes means for analyzing a downlink message from the second wireless communications device prior to initiating the transmission of the first subset of the data; means for predicting a transmission metric for the transmission of the data based at least in part of the analysis of the downlink message; and means for comparing the predicted transmission metric with the threshold to determine if the predicted transmission metric exceeds the threshold. The first wireless communications device further includes means for determining a transmission metric during the transmitting of the first subset of the data; means for comparing the determined transmission metric with the threshold during the transmitting of the first subset of the data to determine if the determined transmission metric exceeds the threshold; and means for including, as part of the first subset of the data, the request for the second wireless communication device to provide the second access resource in response to the comparing. The first wireless communications device further includes wherein the common pool of access resources and the reserved access pool each comprises at least one of scrambling code/access time pairs or interleaver/access time pairs. The first wireless communications device further includes wherein the first wireless communications device is an Internet of Everything (IOE) device and the second wireless communications device is a base station.

Embodiments of the present disclosure further include a first wireless communications device comprising means for searching a common pool of access resources to recover a first subset of data received from a second wireless communications device using a first access resource selected from the common pool of access resources as part of a grant-less transmission. The first wireless communications device further comprises means for receiving a request from the second wireless communications device to provide a second access resource selected from a reserved access pool to the second wireless communications device. The first wireless communications device further comprises means for transmitting an identification of the second access resource selected from the reserved access pool to the second wireless communications device. The first wireless communications device further comprises means for switching to the second access resource to recover a second subset of the data from the second wireless communications device without searching the reserved access pool.

The first wireless communications device further includes means for maintaining the reserved access pool comprising a first subset of access resources of the reserved access pool that are available and a second subset of access resources that are not available; and means for selecting the second access resource from among the first subset of access resources in response to receiving the request from the second wireless communication device. The first wireless communications device further includes means for transmitting the identification of the second access resource as part of an acknowledgement of the request. The first wireless communications device further includes means for receiving the request as part of the first subset of the data from the second wireless communications device. The first wireless communications device further includes means for receiving the request using the first access resource after receiving at least a portion of the first subset of the data. The first wireless communications device further includes wherein the common pool of access resources and the reserved access pool each comprises at least one of scrambling code/access time pairs or interleaver/access time pairs. The first wireless communications device further includes means for determining a range of access resources to include in the common pool of access resources and in the reserved access pool. The first wireless communications device further includes means for transmitting copies of the determined common pool of access resources and the reserved access pool to the second wireless communications device. The first wireless communications device further includes wherein the first wireless communications device is a base station and the second wireless communications device is a user equipment.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for wireless communication, comprising:
   capturing, by an internet of everything (IOE) device, information data;
   transmitting, from the IOE device to a wireless communications device, a first set of data of the captured information data using a first access resource selected from a common pool of access resources as part of a grant-less transmission;
   determining, by the IOE device, to switch from the common pool of access resources to a reserved access pool for transmitting a second set of data of the captured information data based on a metric associated with a channel condition, the second set of data including remaining information data to the first set of data of the captured information data;
   requesting, by the IOE device, the wireless communications device to provide a second access resource from the reserved access pool for transmitting the second set of data of the captured information data based on the determining; and
   transmitting, by the IOE device, the second set of data of the captured information data to the wireless communications device using the second access resource from the reserved access pool after switching from the common pool of access resources to the second access resource,
   wherein the common pool of access resources includes a smaller amount of access resources than the reserved access pool.

2. The method of claim 1, further comprising:
   receiving an acknowledgement from the wireless communications device comprising an identification of the second access resource.

3. The method of claim 1, further comprising:
   selecting, by the IOE device, the first access resource before the transmitting the first set of data,
   wherein the first access resource is selected randomly from the common pool.

4. The method of claim 1, wherein:
   copies of the common pool and the reserved access pool are stored in a memory of the IOE device, and
   the common pool of access resources and the reserved access pool each comprises at least one of scrambling code/access time pairs or interleaver/access time pairs.

5. The method of claim 1, wherein the requesting further comprises:
   setting a flag in a header of the first set of data to identify the request for the second access resource.

6. The method of claim 1, wherein the metric comprises a transmission metric, the method further comprising:
   analyzing, by the IOE device, a downlink message from the wireless communications device prior to initiating the transmission of the first set of data;
   predicting, by the IOE device, the transmission metric for the transmission of data based at least in part of the analysis of the downlink message; and
   comparing, by the IOE device, the predicted transmission metric with a threshold to determine if the predicted transmission metric exceeds the threshold.

7. The method of claim 1, wherein the metric comprises a transmission metric, the method further comprising:
   determining, by the IOE device, the transmission metric during the transmitting of the first set of data;
   comparing, by the IOE device, the determined transmission metric with a threshold during the transmitting of the first set of data to determine if the determined transmission metric exceeds the threshold; and
   including, as part of the first set of data, the request for the wireless communication device to provide the second access resource in response to the comparing.

8. The method of claim 1, wherein the wireless communications device is a base station.

9. A method for wireless communication, comprising:
   searching, by a first wireless communications device, a common pool of access resources to recover a first set of data of information data captured by and received from an internet of everything (IOE) device using a first access resource selected from the common pool of access resources as part of a grant-less transmission;
   receiving, at the first wireless communications device using the first access resource, a request from the IOE device to provide a second access resource selected from a reserved access pool to the IOE device after receiving the first set of data based on a metric associated with a channel condition;
transmitting an identification of the second access resource selected from the reserved access pool to the IOE device; and
switching from the common pool of access resources to the second access resource of the reserved access pool to recover a second set of data of the captured information data from the IOE device without searching the reserved access pool, the second set of data including remaining information data to the first set of data of the captured information data,
wherein the common pool of access resources includes a smaller amount of access resources than the reserved access pool.

10. The method of claim 9, further comprising:
maintaining the reserved access pool comprising a first subset of access resources of the reserved access pool that are available and a second subset of access resources that are not available;
selecting the second access resource from among the first subset of access resources in response to receiving the request from the IOE device; and
transmitting the identification of the second access resource as part of an acknowledgement of the request.

11. The method of claim 9, wherein the receiving the request further comprises:
receiving the request as part of the first set of data from the IOE device.

12. The method of claim 9, wherein the common pool of access resources and the reserved access pool each comprises at least one of scrambling code/access time pairs or interleaver/access time pairs.

13. The method of claim 9, further comprising:
determining a range of access resources to include in the common pool of access resources and in the reserved access pool; and
transmitting, from the first wireless communications device, copies of the determined common pool of access resources and the reserved access pool to the IOE device.

14. The method of claim 9, wherein the first wireless communications device is a base station and the IOE device is a user equipment.

15. An internet of everything (IOE) device, comprising:
a sensor configured to capture information data;
a processor configured to:
select a first access resource from a common pool of access resources for transmitting a first set of data of the captured information data to a wireless communication device as part of a grant-less transmission to the wireless communications device; and
determine to switch from the common pool of access resources to a reserved access pool for transmitting a second set of data of the captured information data based on a metric associated with a channel condition, the second set of data including remaining information data to the first set of data of the captured information data;
request the wireless communications device to provide a second access resource from a reserved access pool based on the determination; and
a transceiver configured to:
transmit the first set of data of the captured information data to the wireless communications device using the first access resource, wherein the first set of data includes the request for the second access resource in response to the determination; and
transmit the second set of data of the captured information data to the wireless communications device using the second access resource from the reserved access pool after switching from the common pool of access resources to the second access resource,
wherein the common pool of access resources includes a smaller amount of access resources than the reserved access pool.

16. The IOE device of claim 15, wherein the transceiver is further configured to:
receive an acknowledgement from the wireless communications device comprising an identification of the second access resource.

17. The IOE device of claim 15, further comprising:
a memory configured to store the common pool of access resources and the reserved access pool,
wherein the common pool of access resources and the reserved access pool each comprises at least one of scrambling code/access time pairs or interleaver/access time pairs.

18. The IOE device of claim 15, wherein the processor is further configured to select the first access resource randomly from the common pool.

19. The IOE device of claim 15, wherein the processor is further configured to set a flag in a header of the first set of data to identify the request for the second access resource.

20. The IOE device of claim 15, wherein the metric comprises a transmission metric and the processor is further configured to:
analyze a downlink message from the wireless communications device prior to initiating the transmission of the first set of data;
predict the transmission metric for the transmission of data based at least in part of the analysis of the downlink message; and
compare the predicted transmission metric with a threshold to determine if the predicted transmission metric exceeds the threshold.

21. The IOE device of claim 15, wherein the metric comprises a transmission metric and the processor is further configured to:
determine the transmission metric during the transmission of the first set of data;
compare the determined transmission metric with a threshold during the transmission of the first set of data to determine if the determined transmission metric exceeds the threshold; and
include, as part of the first set of data, the request for the wireless communications device to provide to the second access resource in response to the comparing.

22. The IOE device of claim 15, wherein the wireless communications device comprises a base station.

23. A first wireless communications device, comprising:
a transceiver configured to receive a first set of data of information data captured by and received from an internet of everything (IOE) device, wherein the first set of data of the captured information data is transmitted using a first access resource selected from a common pool of access resources as part of a grant-less transmission from the IOE device;
a resource coordinator configured to search the common pool of access resources to recover the first set of data received from the IOE device,
wherein the transceiver is further configured to receive a request from the IOE device to provide a second access resource selected from a reserved access pool after receiving the first set of data based on a metric associated with a channel condition and transmit an identification of the second access resource selected from the reserved access pool to the IOE device; and a processor configured to switch the transceiver from the common pool of access resources to the second access resource of the reserved access pool to recover a second set of data of the captured information data from the IOE device without searching the reserved access pool, the second set of data including remaining information data to the first set of data of the captured information data, wherein the common pool of access resources includes a smaller amount of access resources than the reserved access pool.

24. The first wireless communications device of claim 23, wherein:

the resource coordinator is further configured to:
  maintain the reserved access pool comprising a first subset of access resources of the reserved access pool that are available and a second subset of access resources that are not available; and
  select the second access resource from among the first subset of access resources in response to receiving the request from the IOE device; and
the transceiver is further configured to transmit the identification of the second access resource as part of an acknowledgement of the request.

25. The first wireless communications device of claim 23, wherein the transceiver is further configured to receive the request as part of the first set of data from the IOE device.

26. The first wireless communications device of claim 23, wherein the common pool of access resources and the reserved access pool each comprises at least one of scrambling code/access time pairs or interleaver/access time pairs.

27. The first wireless communications device of claim 23, wherein:

the processor is further configured to determine a range of access resources to include in the common pool of access resources and in the reserved access pool; and
the transceiver is further configured to transmit the determined common pool of access resources and the reserved access pool to the IOE device.

28. The first wireless communications device of claim 23, wherein the first wireless communications device comprises a base station.

29. The method of claim 1, wherein the metric comprises a transmission metric, the method further comprising:

analyzing, by the IOE device, the transmission metric between the IOE device and the wireless communication device; and
comparing, by the IOE device, the transmission metric to a threshold determined based on a collision probability in the common pool,
wherein the determining is further based on the comparing.

30. The IOE device of claim 15, wherein the metric comprises a transmission metric, and wherein the processor is further configured to:

analyze the transmission metric between the IOE device and the wireless communication device;
determine an expected duration to complete transmission of the information data based on the transmission metric; and
compare the expected duration to a time threshold, and wherein the determination to switch from the common pool of access resources to the reserved access pool is based on the expected duration exceeds the time threshold.

* * * * *